(12) United States Patent
Poston et al.

(10) Patent No.: US 10,561,132 B2
(45) Date of Patent: Feb. 18, 2020

(54) FISHING DREDGE BOOM

(71) Applicant: Ledge Logic, LLC, San Antonio, TX (US)

(72) Inventors: William M. Poston, Austin, TX (US); Walter C. Cadwallader, San Antonio, TX (US)

(73) Assignee: Ledge Logic, LLC, San Antonio, TX (US)

( * ) Notice: Subject to any disclaimer, the term of this patent is extended or adjusted under 35 U.S.C. 154(b) by 275 days.

(21) Appl. No.: 15/810,929

(22) Filed: Nov. 13, 2017

(65) Prior Publication Data

US 2018/0139943 A1 May 24, 2018

Related U.S. Application Data (60) Provisional application No. 62/425,406, filed on Nov. 22, 2016.

(51) Int. Cl.
*A01K 91/053* (2006.01)
*A01K 85/00* (2006.01)
*A01K 91/08* (2006.01)

(52) U.S. Cl.
CPC ............ *A01K 91/053* (2013.01); *A01K 85/00* (2013.01); *A01K 91/08* (2013.01)

(58) Field of Classification Search
CPC ....... A01K 85/00; A01K 91/053; A01K 91/08
USPC ....................................................... 43/42.74
See application file for complete search history.

(56) References Cited

U.S. PATENT DOCUMENTS

| | | | | |
|---|---|---|---|---|
| 3,193,964 A | * | 7/1965 | Hurst | A01K 91/08 43/43.12 |
| 4,388,774 A | * | 6/1983 | Thoemke | A01K 91/08 114/255 |
| 4,625,450 A | * | 12/1986 | Roemer, Jr. | A01K 91/08 43/43.12 |
| 4,716,674 A | * | 1/1988 | Kammeraad | A01K 91/08 248/231.9 |
| 4,750,288 A | * | 6/1988 | Brennan | A01K 91/08 43/43.1 |
| 4,875,428 A | * | 10/1989 | Schlesch | A01K 91/08 114/255 |
| 5,301,451 A | * | 4/1994 | VanAssche | A01K 91/08 43/21.2 |

(Continued)

OTHER PUBLICATIONS

Tournament Cable Teaser Booms. Located at: http://www.tournamentcable.com/pgs/proddet.cfm?itemid=800-DB1; accessed on Feb. 8, 2018.

(Continued)

*Primary Examiner* — Claude J Brown
(74) *Attorney, Agent, or Firm* — Frost Brown Todd LLC (57) ABSTRACT

A dredge boom for towing a fishing dredge is described and includes an elongated beam having a multi-position ferrule and a series of attachment points to connect to support cables and one or more pulleys, the series of attachment points including at least a support line attachment point, a first pulley attachment point and a terminal end attachment point. A rod butt adapter may be removably connected to the elongated beam using the multi-position ferrule and is able to mount to a universal rod holder. A fishing dredge can then be attached to the dredge boom assembly using fishing line, the one or more pulleys and the attachment points.

17 Claims, 9 Drawing Sheets

(56) References Cited

U.S. PATENT DOCUMENTS

| | | | | |
|---|---|---|---|---|
| 5,752,461 | A * | 5/1998 | Whisenhunt | A01K 91/08 114/253 |
| 5,921,196 | A * | 7/1999 | Slatter | A01K 91/08 114/255 |
| 6,557,481 | B1 * | 5/2003 | Schweid | A01K 91/08 114/255 |
| 8,656,632 | B1 * | 2/2014 | Mercier | A01K 91/08 43/27.4 |
| 8,683,735 | B1 * | 4/2014 | Figari | A01K 91/08 43/18.1 CT |
| 2005/0056198 | A1 * | 3/2005 | Slatter | A01K 91/08 114/255 |
| 2015/0320025 | A1 * | 11/2015 | Pruett | A01K 91/08 43/42.74 |
| 2017/0071178 | A1 * | 3/2017 | Serocki | A01K 91/08 |

OTHER PUBLICATIONS

Elec-Tra-Mate Dredge Master. Located at: http://www.tournamentcable.com/pgs/proddet.cfm?itemid=800-DB1; accessed on Feb. 8, 2018.

Bonze Dredge Boom. Located at: https://www.bonzelures.co.nz/product/1337898; accessed on Feb. 8, 2018.

* cited by examiner

FISHING DREDGE BOOM

CROSS REFERENCE TO RELATED INFORMATION

This application claims the benefit of U.S. Provisional Patent Application No. 62/425,406, filed Nov. 22, 2016, titled "Dredge Boom", the contents of which are hereby incorporated herein in its entirety.

TECHNICAL FIELD

The present disclosure is directed to fishing equipment, and more particularly to an easy mount boom to deploy and drag fishing dredges.

BACKGROUND OF THE INVENTION

Dredge fishing is a method of recreational fishing that fisherman employ to target game fish such as marlin, sailfish, wahoo, tuna and dolphin fish. Dredge fishing first originated in Mexico in the late 1990's and has since spread worldwide throughout the sport fishing community. What fisherman refer to as a "dredge" is the generic name for an umbrella-like spread of subsurface teasers pulled by a boat. The dredge may include things like clear-vinyl strips emblazoned with reflective fish decals, or a school of hookless artificial lures creating a virtual ball of bait that can be trolled behind a boat. The main purpose of this is to mimic a school of swimming baitfish. This presentation is intended to grab the attention of a passing game fish and then attract the fish closer to the boat where the other baits or lures containing hooks are being trolled.

Pulling dredges behind small or midsize boats with a one- or two-person crew is challenging, but very effective. Large boats with towers have a great advantage, because their dredges can be deployed farther back and deeper while still remaining in view from the bridge or tower. Many small and midsize vessels lack that benefit. The technique for smaller boats is to position the dredges as far back as you can and still see them; the objective is spotting fish coming up on them, and being able to quickly adjust a flat-line bait or pitch out another bait while the fish is on the dredge.

Since the inception of dredge fishing, fisherman have been constantly evolving and trying to improve the way that dredges are trolled and retrieved. In the early days of dredge fishing, fishermen would secure their dredges to a cleat on the transom of the boat and troll the dredge straight off the stern of the boat. There were two issues with this method. The first being that the dredges were in the "prop wash" created by the motors so it was hard for fish to see them and also hard for the captain to see where the dredge was and if a fish was following it. The other issue with this method was that it is very difficult to retrieve a dredge by hand in this manner. There is a great deal of resistance created by a dredge being trolled in the water and the captain would usually have to slow down or stop the boat to retrieve a dredge.

After years of growth and evolution of dredge fishing, most experienced sport fishing crews have developed a preferred method for trolling and retrieving dredges. This involves the use of heavy duty electric reels or large conventional reels. The reels are typically mounted to some sort of conventional rod or a shortened custom rod. The line (usually 300 lb-400 lb test monofilament) comes off the rod, going up to a pulley on the outrigger, then down to a second pulley in the water above the dredge, then terminally landed back on the outrigger. Using this method, fishermen are able to get their dredge in "clean water" outside of the prop wash. Additionally, they are able to take advantage of load distribution through multiple pulleys to aid in the retrieval of the dredge.

There are still some issues that arise out of this method. The most pressing one being that this requires an extremely heavy-duty outrigger that are typically found only on large sport fishing yachts. Many recreational fishermen on smaller vessels do not have outriggers that can support the heavy load created by the resistance of a dredge being trolled in the water.

Another issue that arises out of this method of trolling dredges from an outrigger is that it is a permanent setup that cannot be easily removed and replaced each time one wants to fish. This means that your heavy duty electric or conventional reels, which could also be used for other types of fishing, are limited to strictly trolling and retrieving dredges.

Many people have been trying to find an effective way to troll and retrieve dredges without the use of outriggers for these reasons. Other methods that have been tested are the use of downriggers or conventional rods acting as a "dredge boom." This is not effective for multiple reasons. A few examples are the dredges still are in the "prop wash", there is too much resistance to retrieve the dredge, rods will bend and flex, once they are retrieved, the dredges are in the way of the fisherman in the cockpit of the boat. There are many more issues that arise from these methods.

BRIEF SUMMARY OF THE INVENTION

In a preferred embodiment, a dredge boom assembly is described that includes an elongated beam having a series of attachment points to connect a mainline using a first pulley and a terminal end point and one or more support cables and a multi-position ferrule connected to the elongated beam, the multi-position ferrule allowing the boom assembly to mount to a universal rod holder. A reel is connected to the dredge boom assembly, the reel holds the mainline and operable to deploy or retrieve the mainline, where a dredge can be attached to the dredge boom assembly using the mainline and a second pulley assembly.

In another embodiment, a method for deploying, towing and retrieving a dredge boom is described. The method includes mounting a dredge boom assembly to a universal rod holder, where the dredge boom assembly comprises, an elongated beam having a series of attachment points to connect to support cables and one or more pulleys, the series of attachment points including at least a support line attachment point, a first pully attachment point and a terminal end attachment point; and a multi-position ferrule connected to the elongated beam, the multi-position ferrule able to mount to the universal rod holder. The method further includes attaching a dredge to the dredge boom assembly using fishing line and at least one pulley and using a reel to adjust the length of the fishing line to deploy and retrieve the dredge boom.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
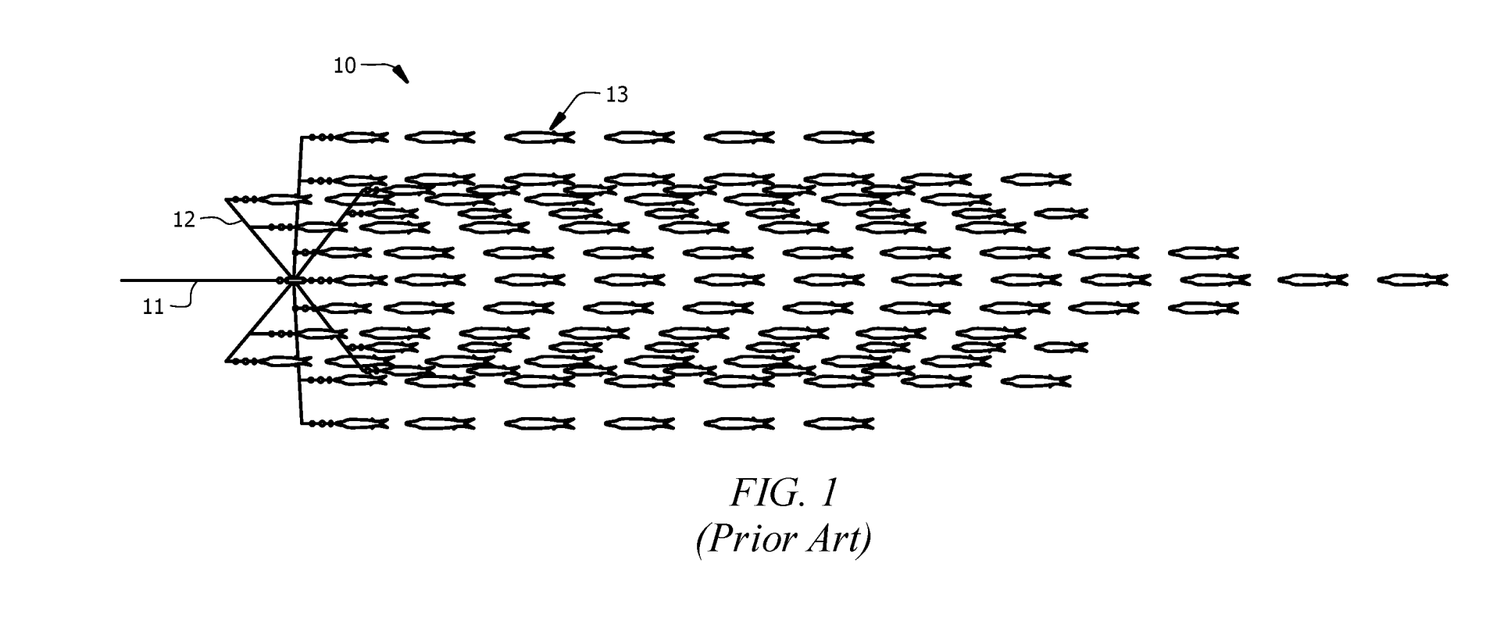
FIG. 1 is a perspective view of an embodiment of a prior art fishing dredge.

An example of a prior art fishing dredge is shown in FIG. 1. The dredge 10 is comprised of a series of spreaders 12, to which a bait fish emulating mechanism 13 is connected. The mechanism may be a series of hookless lures, ribbons with patterns printed on the sides or other similar structure to appear as a school of bait fish when towed. Tow line 11 connects to the boat through a boom or other structure affixed to the boat.

Figure 2:
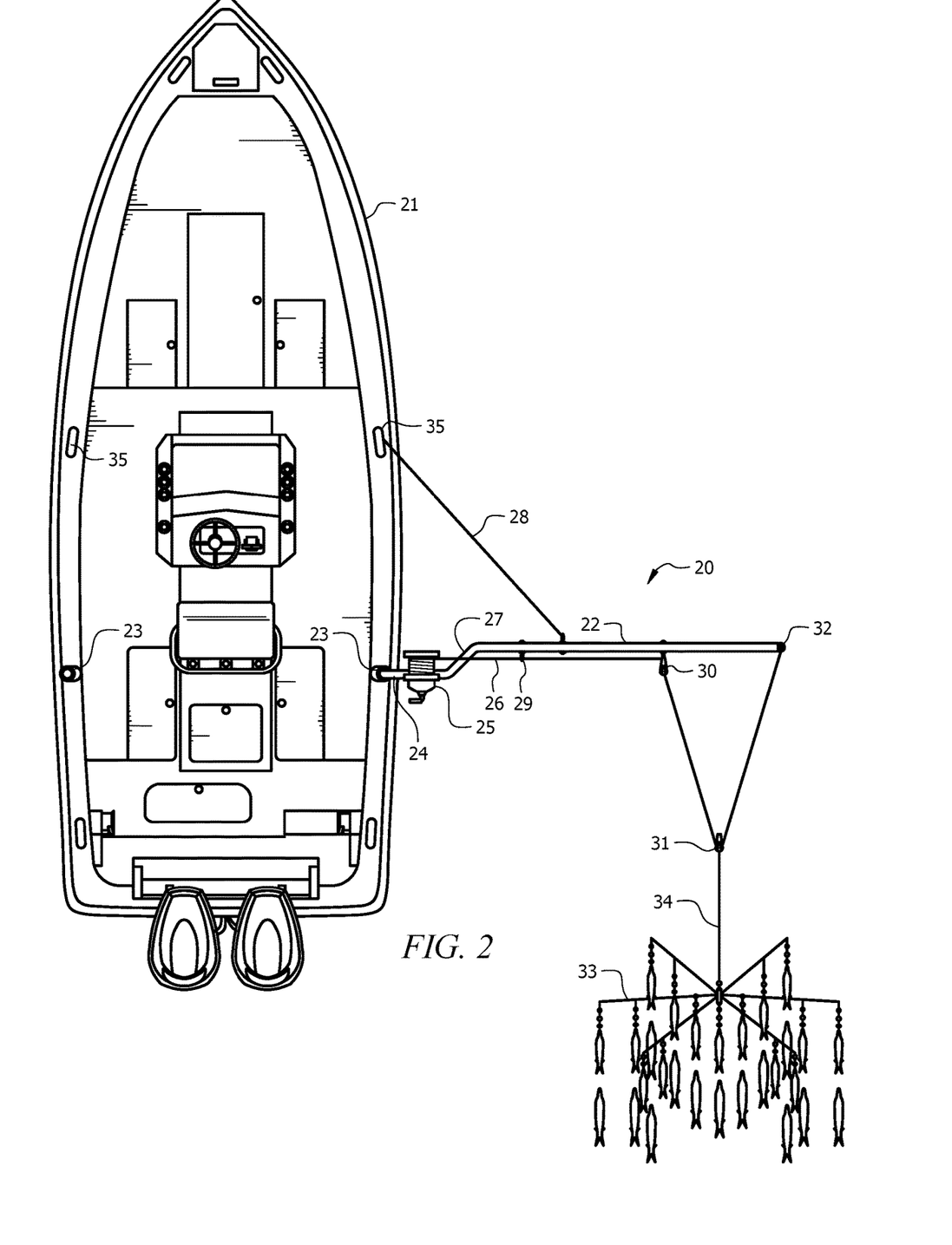
FIG. 2 is a top view of a boat deploying an embodiment of a dredge boom according to the concepts described herein.

Referring now to FIG. 2, a boat 21 deploying an embodiment of a dredge boom assembly 20 according to the concepts described herein are shown. Dredge boom assembly 20 solves the issues that arise with the different methods of pulling and retrieving dredges from a recreational sport fishing boat. Boat 21 typically includes various cleats 35 and fishing rod holders 23 arranged along the side and back of the boat. The cleats 35 allow various ropes and lines to be secured to the boat and the fishing rod holders 23 hold fishing rods that may or may not be in use. Dredge boom assembly 20, according to the concepts described herein uses the existing cleats and rod holders already on the typical fishing boat. No extra hardware is required to be installed on the boat to make use of the dredge boom 20. Dredge boom assembly 20 preferably comprises a boom rod 22 with bend 27. A multi-position ferrule, which will be described in greater detail with reference to FIGS. 3-7, allows the end of the dredge boom to slide into a rod butt 24, which then can be placed in a standard rod holder mounted on the boat.

Boom rod 22 is further secured to the boat with line 28 attached to cleat 35. Line 28 helps support the weight of the dredge as it is pulled through the water. Reel 25 hold line 26 which is used to deploy, tow and retrieve dredge 33. Line 26 passes from reel 25 through guide ring 29 to first pulley 30 then to second pulley assembly 31 and then back to terminal attachment point 32. Dredge tow line 34 attached dredge 33 to the second pulley assembly 31. Reel 25 can be electric or manual and sized to hold enough line to tow dredge 33 to a desired position relative to the boat.

Figure 3:
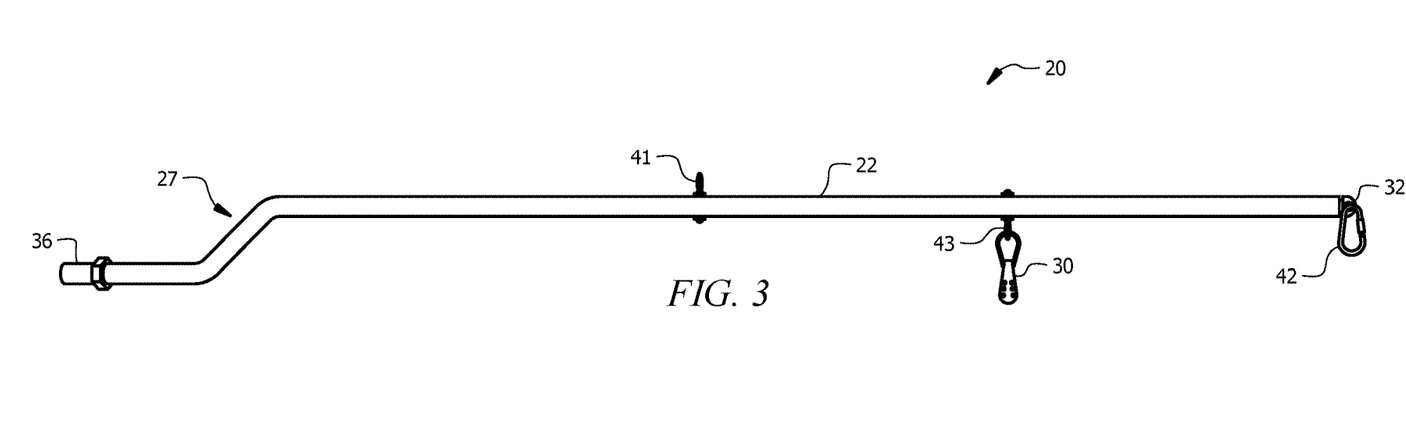
FIG. 3 is a top view of a preferred embodiment of a dredge boom according to the concepts described herein.
Figure 4:
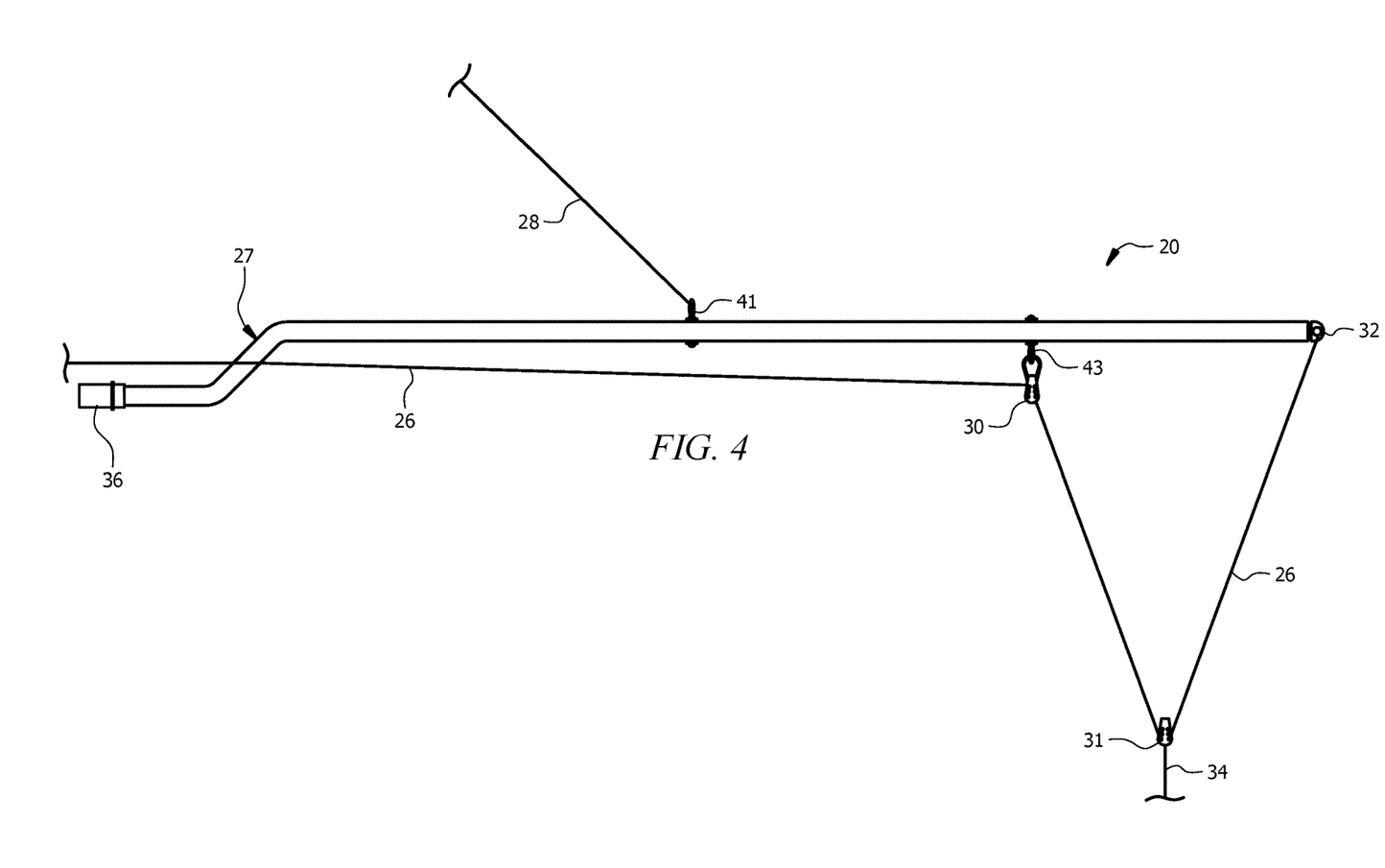
FIG. 4 is a top view of the dredge boom of FIG. 3 showing a preferred embodiment of the rigging system according to the concepts described herein.

Referring now to FIGS. 3 and 4, boom rod 22 is capable of supporting vertically the weight that the dredge configuration exerts and also the horizontal drag forces created by the dredge's movement though the water at speed. FIG. 3 shows the dredge boom without the mainline 26 and support lines such as line 28, while FIG. 4 shows a rigged embodiment of the dredge boom assembly. A series of attachment points, such as attachment points 41 and 43 and terminal end point 32 are distributed along the length of boom rod 22. The attachment points can be metal rings or integral apertures or other attachment scheme, and can be spaced along the structural pole to allow for the attachment (whether fixed or removable) of various pullies and lines such as first pulley 30 and support line 28. Preferably, the attachment points include at least the terminal point 32 of mainline which can be attached using a carabiner 42 or similar device, at least attachment point 43 for a pulley 30, and attachment point 41 for potential support line(s) 28 that assists in counteracting forces exerted on the beam. Other attachment points can be included for guide rings for the mainline or other similar devices. Preferred embodiments of the deployed device incorporate an attachment for the dredge to the main line via a pulley or similar non-fixed attachment, such as pulley assembly 31 and dredge tow line 34 shown in FIG. 4. Allowing the deployed device to attach securely to the main line allows the device to move along the main line freely as line is deployed or retrieved.

Figure 8:
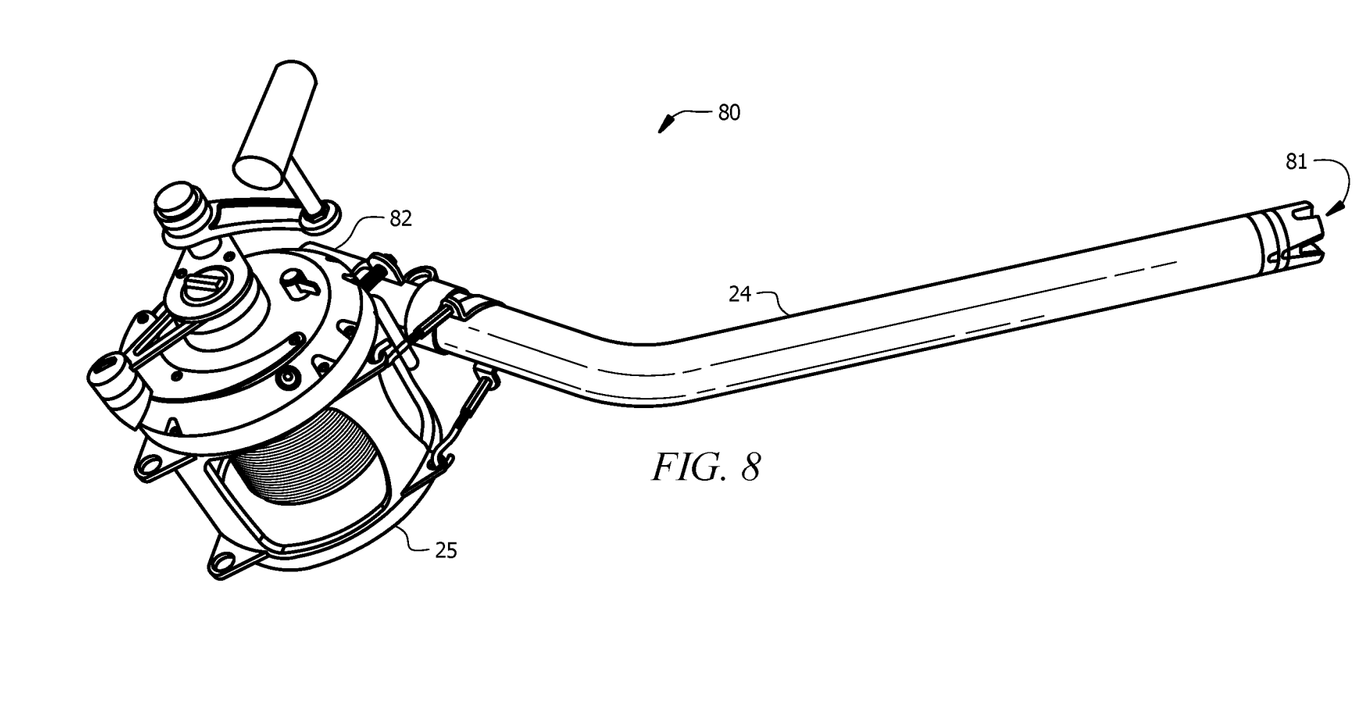
FIG. 8 is a perspective view of an embodiment of a rod butt and reel.

Dredge boom rod 22 also includes a multi-position ferrule 36 that is designed to slide into a rod butt, such as rod butt 24 from FIG. 8. Multi-position ferrule may be of different sizes to accommodate various rod butt, as described in FIGS. 6A and 6B, and is preferably welded to the boom rod 22, though it may also be removably attached to allow different ferrules to be used with the same boom. A double bend 27 is included at base of main beam that creates an offset yet parallel trajectory of the main beam of the dredge boom rod 22 and the base that houses an attachment point. The double bend or offset is preferably comprised of two angle changes that are of equal angle deflection and opposite in relative direction of angle change. The desired offset of the main beam from the base can be achieved by increasing the angle of deflection or by increasing the length of span between bends or both to provide allowances for different size offsets for varying sizes of final product.

Figure 5:
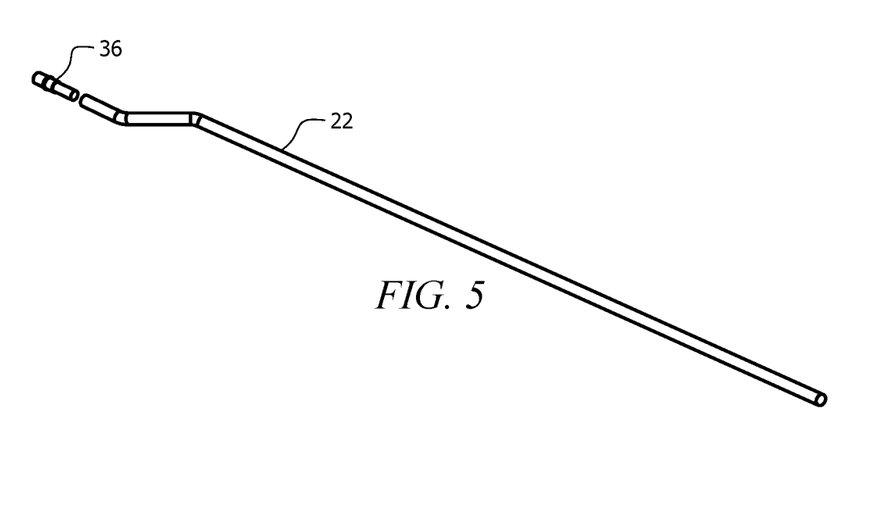
FIG. 5 is a perspective view of the dredge boom of FIG. 3 showing an embodiment of a multi-position ferrule according to the concepts described herein.

Referring now to FIG. 5, preferred embodiments include a multi-positional ferrule 36. This adapter mates to the industry standard rod butt base but rather than a single position, where the "top" of the mated rod and the "top" of the base are in alignment, the adapter includes multi-positional mating ends that allows the dredge boom to be rotated to the left or right of center and then locked into place within the rod butt base. The incorporation of this "multi-positional" ferrule allows the user to deploy the dredge boom on either the port or starboard side of the boat and eliminates the need for port and starboard side products. The multi-position ferrule 36 may be secured permanently to the main beam. It may be secured to the industry standard rod butt through industry standard attachment methods via the use of a collet nut. A raised collar may be built into the multi-positional base to accommodate the requirements of a collet nut for secure attachment to the rod butt base.

Figure 6A:
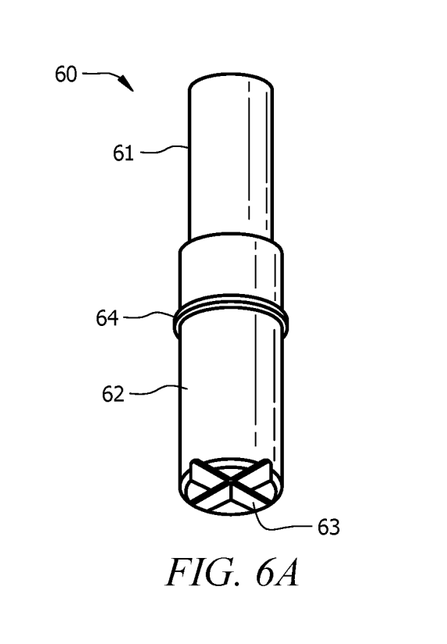
FIGS. 6A and 6B are perspective views of different multi-position ferrules to accommodate various sizes of rod butt bases.
Figure 6B:
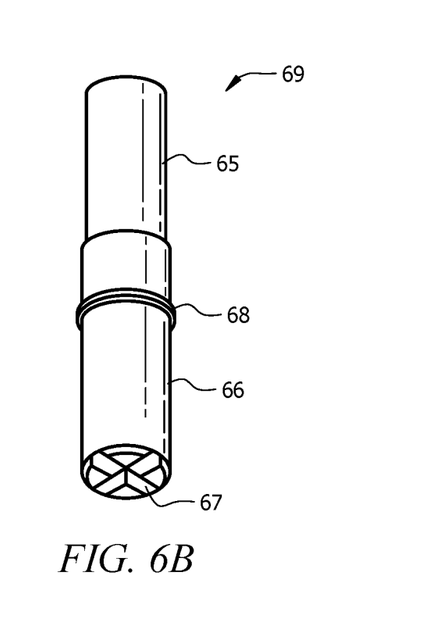

Referring now to FIGS. 6A and 6B, embodiments of multi-position ferrules 60 and 69 are shown which accommodate different size rod butts. Base 60 includes first boom mating portion 61, first raised collar 64, first rod butt mating portion 62 and first locking pattern 63. Base 69, which is a different size than base 60, includes second boom mating portion 65, second raised collar 68, second rod butt mating portion 66 and second locking pattern 67. Raised collars, such as first raised collar 64, allow for the use of a collet nut to make sure that the rod butt is securely attached to the boom rod. Rod holder mating portions, such as first rod holder mating portion 62, insert into the rod butt while locking patterns, such as first locking pattern 63, engage with raised portions in the rod butt to prevent the boom from twisting in the rod butt and to allow multiple orientations of the boom assembly relative to the rod butt. There are at least two standard sizes of rod butts and each rod butt mating is sized to fit those standard rod butts. Rod butt mating portions, as shown in FIGS. 6A and 6B are examples of two of several industry standard rod butt sizes.

Figure 7:
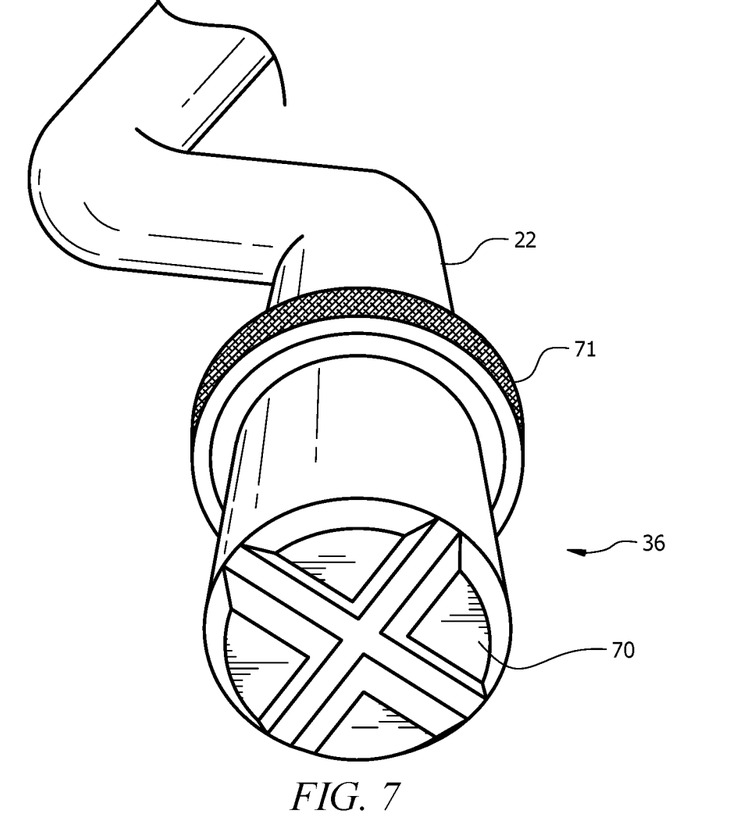
FIG. 7 is a perspective end view of an embodiment of a multi-position ferrule showing according to the concepts described herein.

FIG. 7 shows a preferred embodiment of the locking pattern 70 and collet nut 71 in greater detail.

Figure 9:
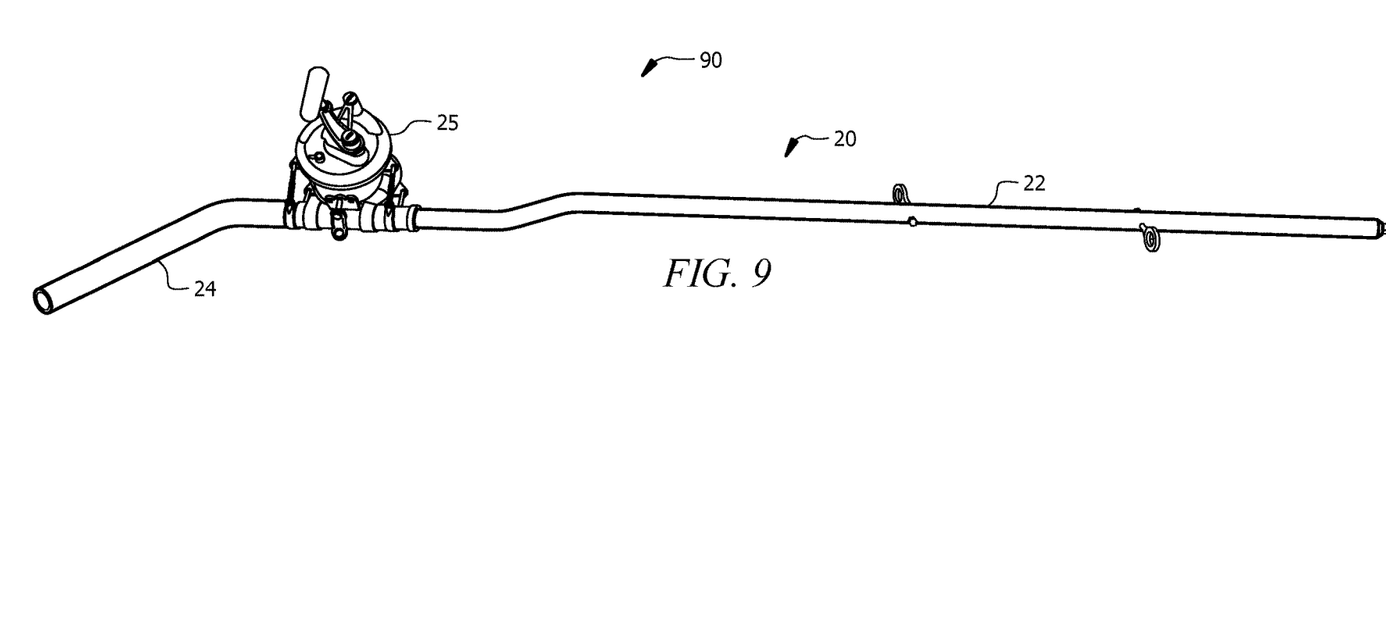
FIG. 9 is a perspective view of the rod butt of FIG. 8 engaged with an embodiment of a dredge boom according to the concepts described herein.
Figure 10:
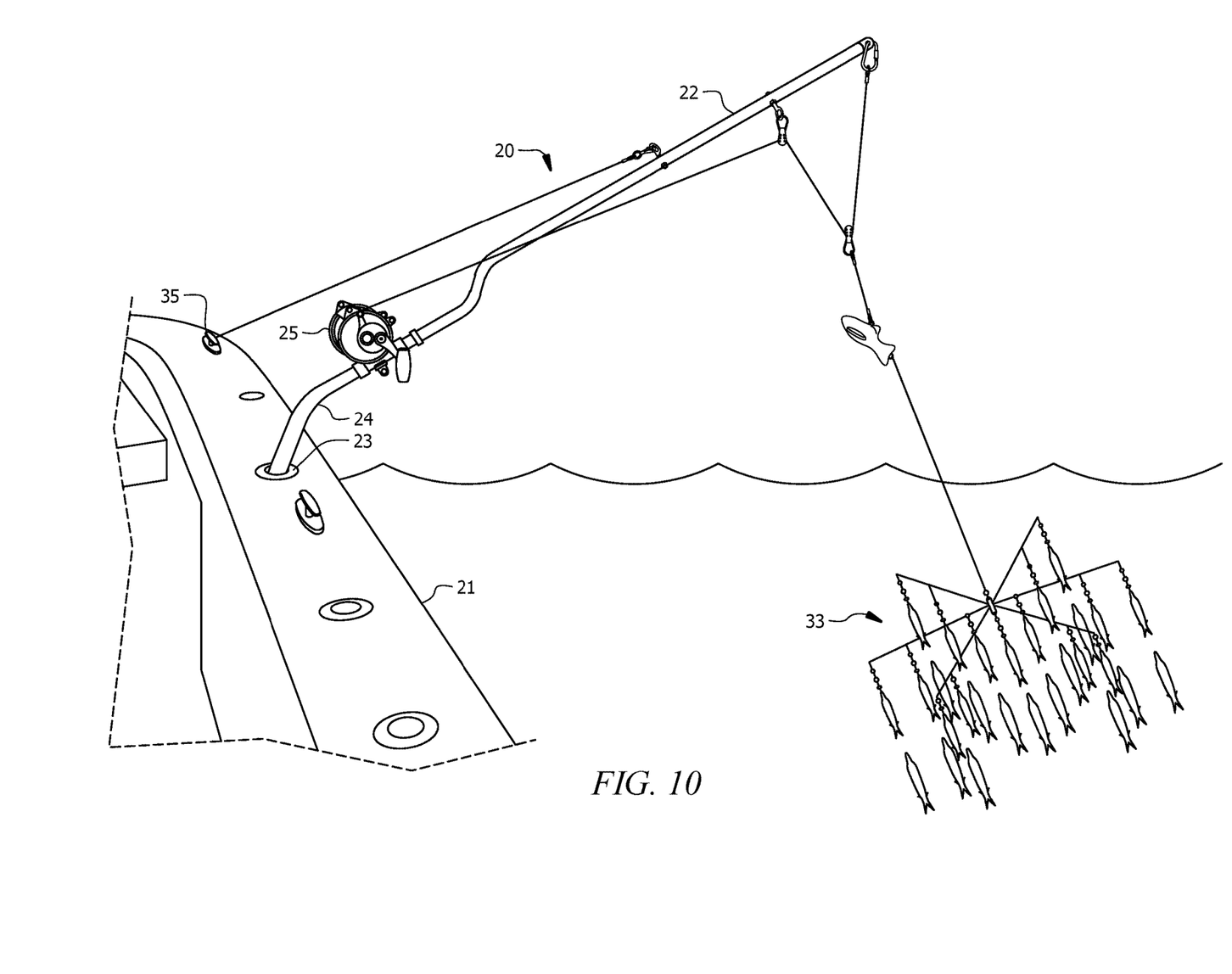
FIG. 10 is a perspective view of an embodiment of a dredge boom and rod butt mounted in a rod holder on a boat.

Referring now to FIG. 8, an embodiment of a rod butt assembly 80 for use with the dredge boom is shown. Rod butt 24 can have a reel 25 mounted thereto. Receiving end 82 has an opening allowing the multi-position ferrule of the rod boom assembly to slidably engaged therein with the locking pattern holding the rod boom in a fixed position relative to the rod butt 24. Mating end 81 engages with a locking pattern in a rod holder on a boat to hold the rod butt securely to the rod holder. FIG. 9 shows an embodiment of a complete assembly 90 with the rod butt 24 and reel 25 connected to the boom assembly 20 with boom rod 22. FIG. 10 shows the dredge boom assembly 20 mounted to the rod butt 24 with reel 25, and the whole assembly being mounted on boat 21. As described with respect to FIG. 2, rod butt 24 is inserted into rod holder 23. A support line is connected to cleat 35 to support rod boom 22 as it tows dredge 33.

The dredge boom described herein extends the range perpendicular to the direction of travel that the dredge can be deployed. It makes use of the mechanical advantage offered by a pulley system rather than simply using a pulley as a friction free line guide. By offsetting the main beam and incorporating an elevation change it prevents contact of the main beam and the main line thus reducing potential friction, snags, and breakage. The use of the multi-positional base makes use of industry standard fittings that make the dredge boom easily attachable to an existing rod butt base and reel, and allows for multi-side deployment of the dredge boom.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:
1. A dredge boom comprising:
  an elongated beam having a series of attachment points to connect to support cables and one or more pulleys, the series of attachment points including at least a support line attachment point, a first pulley attachment point and a terminal end attachment point; and
  a ferrule connected to the elongated beam, the ferrule able to mount to a rod butt base;
  wherein a dredge can be attached to the dredge boom using fishing line, the one or more pulleys and the attachment points.
2. The dredge boom of claim 1, further comprising a reel mounted to the rod butt base, the reel operable to retrieve and deploy the dredge.
3. The dredge boom of claim 1 wherein the elongated beam includes an offset portion to offset a main portion of the beam from the ferrule.
4. The dredge boom of claim 3 wherein the offset portion of the elongated beam is adjacent to the ferrule.
5. The dredge boom of claim 1 wherein the fishing line forms a mainline and the dredge is attached to the dredge boom along the mainline wherein the mainline runs from a reel through a first pulley and to the terminal end point, the dredge attached to the mainline by a second pulley assembly attached along the mainline between the first pulley and the terminal end point.
6. The dredge boom of claim 1 wherein the ferrule is a multi-position ferrule.
7. A dredge boom assembly comprising:
  an elongated beam having a series of attachment points to connect a mainline using a first pulley and a terminal end point and one or more support cables; and
  a rod butt base engaged with the elongated beam using a ferrule connected to the elongated beam;
  a reel connected to the rod butt base, the reel holding the mainline and operable to deploy or retrieve the mainline;
  wherein a dredge can be attached to the dredge boom assembly using the mainline and a second pulley assembly.
8. The dredge boom assembly of claim 7 wherein the elongated beam includes an offset portion to offset a main portion of the beam from the ferrule.
9. The dredge boom assembly of claim 8 wherein the offset portion of the elongated beam is adjacent to the ferrule.
10. The dredge boom assembly of claim 7 wherein the dredge is attached to the dredge boom along the mainline wherein the mainline runs from the reel through the first pulley and to the terminal end point, the dredge being attached to the mainline by the second pulley assembly attached along the mainline between the first pulley and the terminal end point.

11. The dredge boom assembly of claim 7 wherein the ferrule is a multi-position ferrule.

12. A method for deploying, towing and retrieving a dredge comprising:
- mounting a dredge boom assembly to a rod holder, the dredge boom assembly comprising:
  - an elongated beam having a ferrule and a series of attachment points to connect to support cables and one or more pulleys, the series of attachment points including at least a support line attachment point, a first pulley attachment point and a terminal end attachment point; and
  - a rod butt adapter removably connected to the elongated beam using the ferrule, the rod butt adapter able to mount to the rod holder;
- attaching a dredge to the dredge boom assembly using fishing line and at least one pulley;
- using a reel to adjust the length of the fishing line to deploy and retrieve the dredge boom.

13. The method of claim 12, further comprising a reel mounted to the rod butt adapter to retrieve and deploy the dredge boom.

14. The method of claim 12 wherein the elongated beam includes an offset portion to offset a main portion of the beam from the rod butt adapter.

15. The method of claim 14 wherein the offset portion of the elongated beam is adjacent to the rod butt adapter.

16. The method of claim 12 wherein the fishing line forms a mainline and the dredge is attached to the dredge boom along the mainline wherein the mainline runs from a reel through a first pulley and to the terminal end point, the dredge attached to the mainline by a second pulley assembly along the mainline between the first pulley and the terminal end point.

17. The method of claim 12 wherein the ferrule is a multi-position ferrule.

* * * * *